(12) United States Patent
Ahn et al.

(10) Patent No.: US 8,446,369 B2
(45) Date of Patent: May 21, 2013

(54) METHOD FOR ALLOCATING CHARACTERS AND INPUT DEVICE USING THE SAME

(75) Inventors: Jee-Hwan Ahn, Daejeon (KR);
Seung-Kwon Cho, Guri-si (KR);
Byoung-Chun Jeon, Daejeon (KR);
Kwang Ho Kook, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 744 days.

(21) Appl. No.: 12/530,744

(22) PCT Filed: Mar. 12, 2008

(86) PCT No.: PCT/KR2008/001401
§ 371 (c)(1),
(2), (4) Date: Sep. 10, 2009

(87) PCT Pub. No.: WO2008/111797
PCT Pub. Date: Sep. 18, 2008

(65) Prior Publication Data
US 2010/0110015 A1    May 6, 2010

(30) Foreign Application Priority Data
Mar. 12, 2007   (KR) .......................... 10-2007-0024052

(51) Int. Cl.
*G09G 5/00* (2006.01)
*G06F 3/02* (2006.01)

(52) U.S. Cl.
USPC ............................................ 345/171; 341/28

(58) Field of Classification Search
USPC ...... 345/168–171; 341/28; 400/110; 715/703
See application file for complete search history.

(56) References Cited

U.S. PATENT DOCUMENTS

| 6,462,678 B1 * | 10/2002 | Ahn ................................ 341/28 |
| 7,008,127 B1 * | 3/2006 | Kurriss .......................... 400/486 |
| 7,626,574 B2 * | 12/2009 | Kim .............................. 345/168 |
| 2003/0122785 A1 | 7/2003 | Jayachandra |
| 2008/0042885 A1 | 2/2008 | Kunigita et al. |

FOREIGN PATENT DOCUMENTS

| JP | 6-295216 | 10/1994 |
| KR | 1999-0024219 | 7/1999 |
| KR | 2000-0005855 | 4/2000 |
| KR | 2001-0036374 | 5/2001 |
| KR | 2002-0074240 | 9/2002 |
| KR | 2002-0093280 | 12/2002 |
| KR | 10-2005-0060048 | 6/2005 |
| KR | 10-2006-0112584 | 11/2006 |

OTHER PUBLICATIONS

International Search Report for PCT/KR2008/001401, mailed Jun. 24, 2008.

\* cited by examiner

*Primary Examiner* — Kevin M Nguyen
*Assistant Examiner* — Kenneth B Lee, Jr.
(74) *Attorney, Agent, or Firm* — Staas & Halsey LLP

(57) ABSTRACT

When characters are allocated to a keyboard, a plurality of consonants are divided into a plurality of groups according to pronunciation position in the oral cavity, and the groups are allocated to corresponding columns on the keyboard of (3) rows and (10) columns. A plurality of vowels are allocated to the corresponding columns according to the pronunciation position in the oral cavity. In this instance, the consonants and the vowels of which the pronunciation position are near the lips are allocated to the middle area of the area of (3) rows and (10) columns, and the consonants and the vowels of which the pronunciation position are near the vocal chords are allocated to the outer part of the area of (3) rows and (10) columns. The consonants and the vowels are allocated to the corresponding rows of the area of (3) rows and (10) columns according to usage frequency.

17 Claims, 5 Drawing Sheets

【Figure 1】
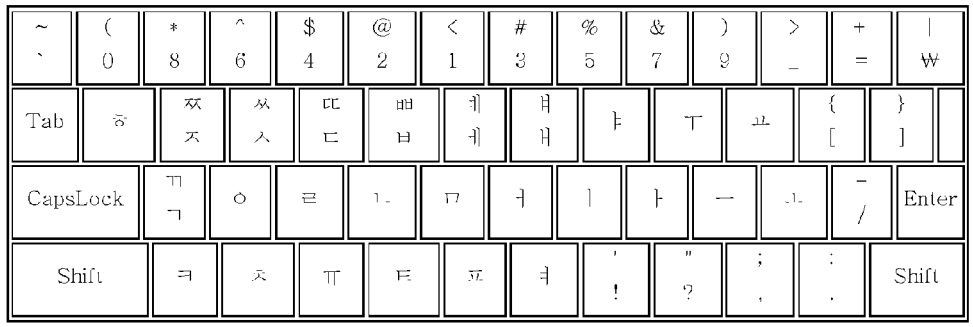
【Figure 2】
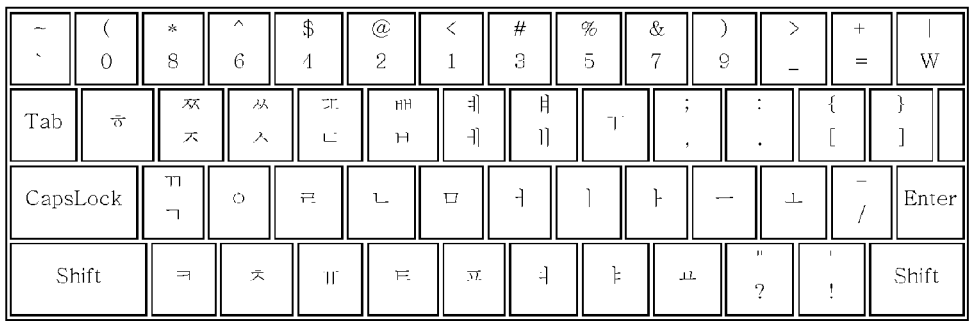
【Figure 3】
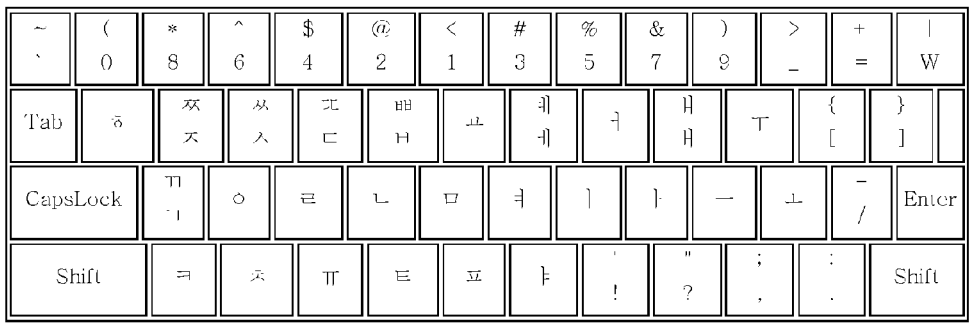

【Figure 4】
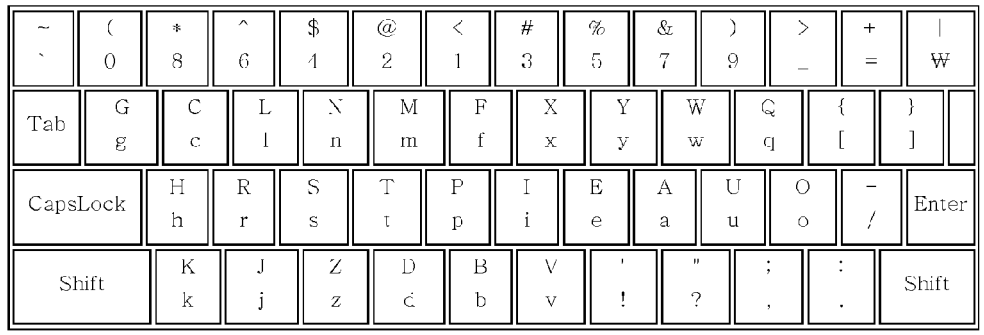
【Figure 5】
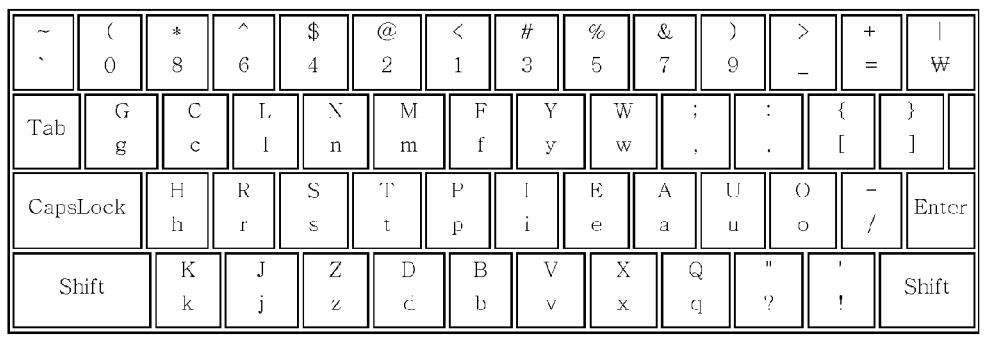
【Figure 6】
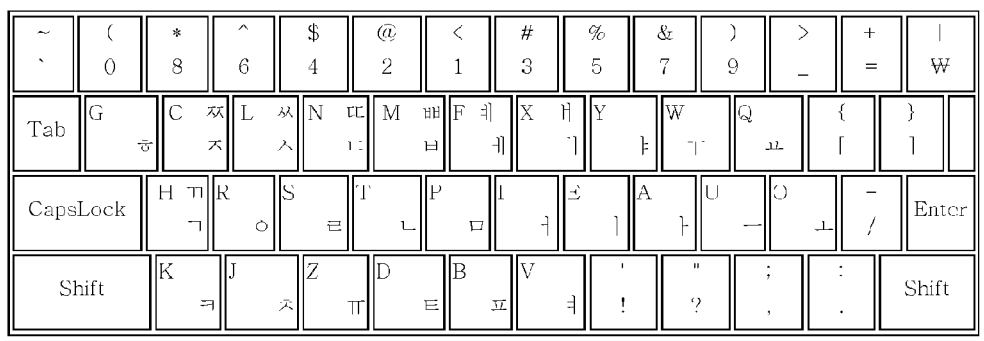

【Figure 7】
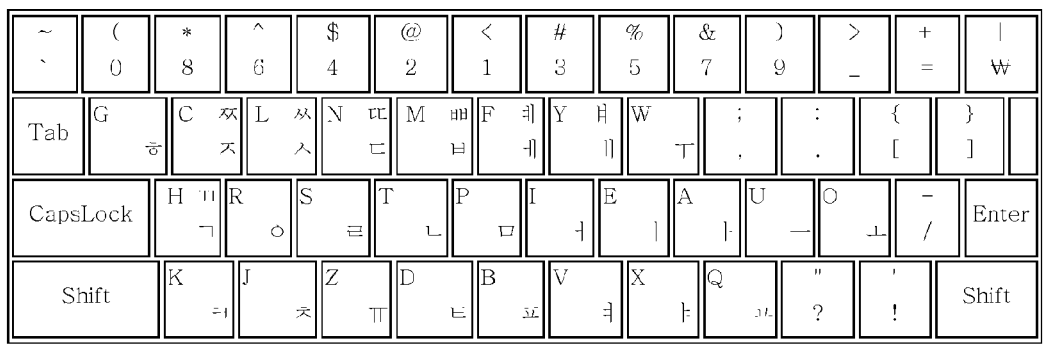
【Figure 8】
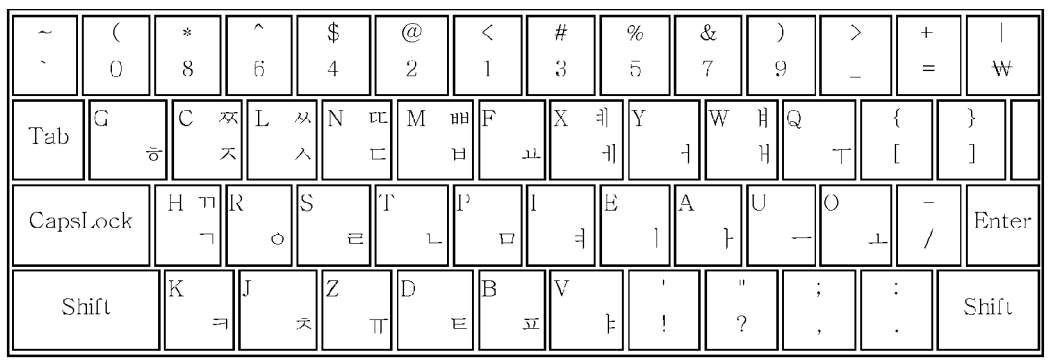
【Figure 9】
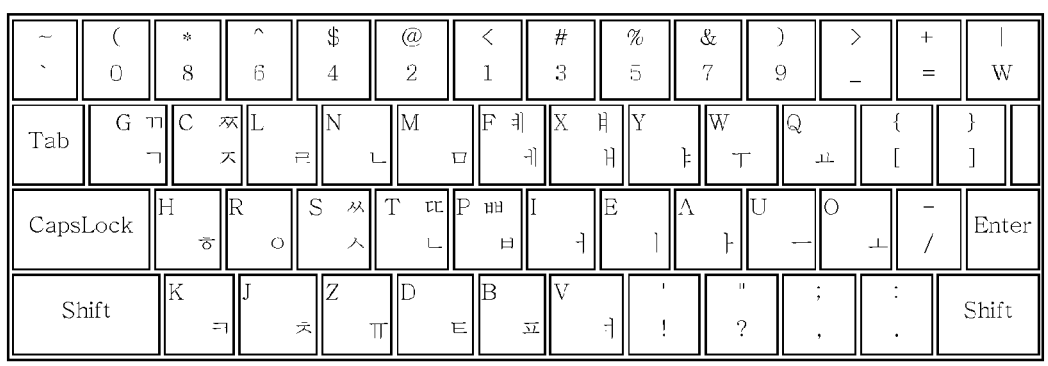

【Figure 10】
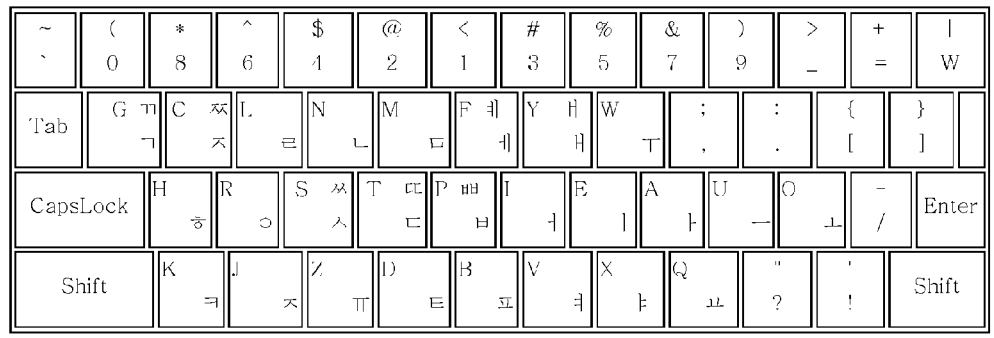
【Figure 11】
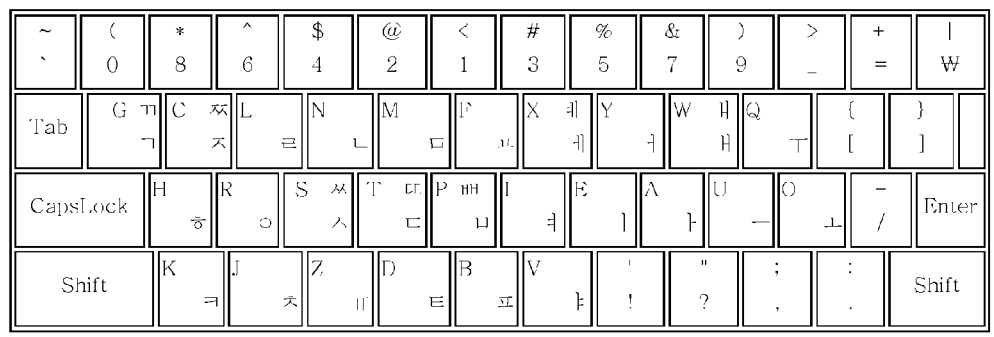
【Figure 12】

【Figure 13】

| 1 P M B<br>ㅁ ㅂ ㅍ ㅃ | 2 I F V<br>ㅓ ㅋ ㅖ | 3 A W Q<br>ㅏ ㅜ ㅠ |
|---|---|---|
| 4 T N D<br>ㄴ ㄷ ㅌ ㄸ | 5 E Y X<br>ㅣ ㅑ ㅒ | 6 U , ?<br>ㅡ , ? |
| 7 S L Z<br>ㄹ ㅅ ㅆ | 8 R C J<br>ㅇ ㅈ ㅊ ㅉ | 9 O . !<br>ㅗ ㅛ . ! |
| * | 0 H G K<br>ㄱ ㅎ ㅋ ㄲ | # |

【Figure 14】

| 1 P M B<br>ㅁ ㅂ ㅍ ㅃ | 2 I F V<br>ㅓ ㅛ ㅑ ㅠ | 3 A Y ?<br>ㅏ ㅓ ? |
|---|---|---|
| 4 T N D<br>ㄴ ㄷ ㅌ ㄸ | 5 E X !<br>ㅣ ㅖ ! | 6 U W ,<br>ㅡ ㅒ , |
| 7 S L Z<br>ㄹ ㅅ ㅆ | 8 R C J<br>ㅇ ㅈ ㅊ ㅉ | 9 O Q .<br>ㅗ ㅜ . |
| * | 0 H G K<br>ㄱ ㅎ ㅋ ㄲ | # |

METHOD FOR ALLOCATING CHARACTERS AND INPUT DEVICE USING THE SAME

CROSS REFERENCE TO RELATED APPLICATIONS

This application claims the benefit under 35 U.S.C. Section 371, of PCT International Application Number PCT/KR2008/001401, filed Mar. 12, 2008 and Korean Application No. 10-2007-0024052 filed Mar. 12, 2007, the contents of all of which are incorporated herein by reference.

TECHNICAL FIELD

The present invention relates to a method for allocating characters and an input device using the same. More particularly, the present invention relates to a method for allocating Korean characters, English characters, or Korean/English characters on a keyboard of an input device.

This work was supported by the IT R&D program of MIC/IITA [2006-S-009-01, The Development of WiBro Service and Operating Standard].

BACKGROUND ART

The current Korean dual type of keyboard has consonant keys on the left hand side and vowel keys on the right hand side thereof with no consideration of unique characteristics and ergonomic characteristics of Korean, and hence it is difficult to memorize the position of the Korean characters on the Korean keyboard and it is difficult to input the Korean characters quickly.

Regarding the English keyboard, the Qwerty keyboard and the Dvorak keyboard are American standards, but the Qwerty keyboard is generally used in Korea. The Qwerty keyboard has been used for typewriters in which keys for characters that are often sequentially pressed are arranged apart from each other so that they may not be jammed, and hence the typewriting speed is increased.

In general, Korean characters and English characters are input by changing the mode on a single keyboard, and the dual type Korean types and the Qwerty English types are displayed on the keyboard. However, the dual type of Korean keyboard and the Qwerty English keyboard were separately invented without any relation between them, and hence it is required for a user who is experienced in the Korean keyboard to newly learn the arrangement of the English keyboard when it is desired to input English characters.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a character allocating method for allowing easy memorization of character location and increasing character input speed, and an input device using the method.

Technical Solution

To achieve the technical object, Korean characters, English characters, or Korean/English characters are allocated on the keyboard in consideration of pronunciation positions in the oral cavity.

In one aspect of the present invention, a method for allocating characters to a keyboard including an area of 3 rows and 10 columns includes: dividing at least some of a plurality of consonants into a plurality of consonant groups according to pronunciation positions within the oral cavity; allocating the consonant groups to corresponding columns in a first area of the area of 3 rows and 10 columns; and allocating a plurality of vowels to a second area of the area of 3 rows and 10 columns, wherein the first area is one of a left area and a right area of the area of 3 rows and 10 columns and the second area is the other one thereof.

The respective consonant groups may be allocated in the order of positions that correspond to the little finger to positions that correspond to the index finger of the first area, and the pronunciation position of the consonant group allocated to the position that corresponds to the index finger may be nearer the lips than that of the consonant group allocated to the position that corresponds to the little finger. The method may further include allocating a plurality of consonants belonging to the respective consonant groups to corresponding rows according to usage frequency.

The consonant having the greatest usage frequency from among a plurality of consonants belonging to the respective consonant groups may be allocated to the second row in the area of 3 rows and 10 columns, the consonant having the second greatest usage frequency from among the consonants may be allocated to the first row of the area of 3 rows and 10 columns, and the residual consonants may be allocated to the third row of the area of 3 rows and 10 columns.

The consonants may be divided into the plurality of consonant groups so as to reduce the frequency of sequential input in the same column.

In another aspect of the present invention, a method for allocating Korean characters and English characters to a keyboard including an area of 3 rows and 10 columns includes: allocating a plurality of English consonants to a first area of the area of 3 rows and 10 columns; allocating a plurality of English vowels to a second area of the area of 3 rows and 10 columns; allocating a plurality of Korean consonants to the same column as that to which English consonants having similar phonetic values are allocated; and allocating a plurality of Korean vowels to an area other than the area to which the plurality of Korean consonants are allocated in the area of 3 rows and 10 columns.

The English consonants other than "X" and "Q" from among the plurality of English consonants may be divided into a plurality of consonant groups according to pronunciation position in the oral cavity, the respective consonant groups may be allocated to the corresponding column in the area of 3 rows and 10 columns on the keyboard, and a plurality of English consonants belonging to the respective consonant groups may be allocated to the corresponding row according to usage frequency.

The plurality of Korean consonants may be allocated to the positions to which the English consonants having similar phonetic values are allocated.

In another aspect of the present invention, a method for allocating characters to a small keyboard including an area of 4 rows and 3 columns includes dividing at least some of a plurality of English consonants into a plurality of consonant groups according to pronunciation positions within the oral cavity, and allocating a plurality of English consonants belonging to the same consonant group to the same positions in the area of 4 rows and 3 columns.

The method may further include allocating a plurality of Korean consonants to the same positions as those to which English consonants having similar phonetic values are allocated.

In another aspect of the present invention, an input device including a keyboard having an area of 3 rows and 10 columns includes: a plurality of first keys to which a plurality of consonants are respectively allocated and that are formed in a first area of the area of 3 rows and 10 columns; and a plurality of second keys to which a plurality of vowels are allocated and that are formed in a second area of the area of 3 rows and 10 columns, wherein the first area is one of a left area and a right area of the area of 3 rows and 10 columns, and the second area is the other one thereof, wherein at least some of the plurality of consonants are divided into a plurality of consonant groups according to the pronunciation position within the oral cavity, and wherein the consonants that are allocated to the first keys positioned in the same column in the area of 3 rows and 10 columns belong to the same consonant group.

The consonant having the greatest usage frequency in each consonant group may be allocated to the first key that is positioned in the second row in the area of 3 rows and 10 columns, the consonant having the second greatest usage frequency may be allocated to the first key that is positioned in the first row, and the residual consonant may be allocated to the first key that is positioned in the third row.

In another aspect of the present invention, an input device including a keyboard having an area of 3 rows and 10 columns includes: a plurality of first keys to which a plurality of English consonants are allocated and that are formed in a first area of the area of 3 rows and 10 columns; and a plurality of second keys to which a plurality of English vowels are allocated and that are formed in a second area of the area of 3 rows and 10 columns, wherein the first area is one of a left area and a right area of the area of 3 rows and 10 columns and the second area is the other one thereof, wherein a plurality of Korean consonants are allocated to the first keys that are positioned in the columns to which the English consonants having similar phonetic values are allocated in the area of 3 rows and 10 columns, and wherein a plurality of Korean vowels are allocated to the first keys except the first keys to which the plurality of Korean consonants are allocated from among the plurality of first keys and the plurality of second keys.

The Korean consonants may be allocated to the first keys to which the English consonants having similar phonetic values are allocated.

In another aspect of the present invention, an input device including a small keyboard having an area of 4 rows and 3 columns includes a plurality of first keys to which a plurality of English consonants are allocated and a plurality of second keys to which a plurality of English vowels are allocated, wherein at least some of the plurality of English consonants are divided into a plurality of consonant groups according to the pronunciation position within the oral cavity, and wherein the English consonants allocated to the same first keys belong to the same consonant group.

A plurality of Korean consonants may be allocated to the first keys to which the English consonants having similar phonetic values are allocated from among the plurality of first keys, and a plurality of Korean vowels may be allocated to the residual first keys excepting the first keys to which the plurality of Korean consonants are allocated from among the plurality of first keys and the plurality of second keys.

In another aspect of the present invention, a method for allocating characters and punctuation marks to a keyboard including an area of 3 rows and 10 columns includes allocating a plurality of consonants and a plurality of vowels to 26 keys from among the 30 keys that are allocated to the area of 3 rows and 10 columns, and allocating a plurality of punctuation marks including "!", """, "?", """, ",", ";", ".", and ":" to the residual 4 keys of the area of 3 rows and 10 columns.

The punctuation marks ",", ".", "!", and "?" may be allocated to be used without using the "SHIFT" key.

BRIEF DESCRIPTION OF THE DRAWINGS

FIGS. 1 to 3 respectively show a Korean keyboard of an input device according to first to third exemplary embodiments of the present invention.

FIG. 4 and FIG. 5 respectively show an English keyboard of an input device according to fourth and fifth exemplary embodiments of the present invention.

FIGS. 6 to 14 respectively show a Korean/English keyboard of an input device according to sixth to fourteenth exemplary embodiments of the present invention.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprising/including" and variations such as "comprises/includes" will be understood to imply the inclusion of stated elements but not the exclusion of any other elements.

A Korean character allocating method, an English character allocating method, and a Korean/English character allocating method, as well as an input device using the same according to exemplary embodiments of the present invention, will be described with reference to drawings.

Korean character allocating method according to first to third exemplary embodiments of the present invention and an input device using the same will be described with reference to FIG. 1 to FIG. 3. In the first to third exemplary embodiments of the present invention, the Korean characters are allocated to the area of 3 rows and 10 columns on the keyboard of the input device, and the area of 3 rows and 10 columns includes 30 keys that are arranged in the 3 rows and 10 columns.

FIGS. 1 to 3 respectively show a Korean keyboard of an input device according to first to third exemplary embodiments of the present invention.

In the general dual type of keyboard, the two Korean types are 19 consonants and 14 vowels. The number of consonant digraphs of the dual type of keyboard is 5 ("ㅃ", "ㄸ", "ㅆ", "ㅉ", and "ㄲ"), the consonant digraphs are respectively generated by combining the consonant and the "SHIFT" key, the diphthongs of "ㅒ" and "ㅖ" are respectively generated by combining the "ㅐ" key, the "ㅔ" key, and the "SHIFT" key, and hence the keys to be considered in the case of keyboard allocation include 14 consonant keys and 12 vowel keys.

Table 1 shows classification according to the pronunciation positions in the oral cavity and frequency grades according to usage frequencies for the 14 Korean consonant keys to be allocated on the Korean keyboard according to the first to third exemplary embodiments of the present invention. In Table 1, the pronunciation position approaches the lips as it goes to the left, and the pronunciation position approaches the vocal chords as it goes to the right. The frequency grades are decreased as the number in the parentheses is increased.

TABLE 1

| Pronunciation position | Lips◄ | | | ► Vocal Chords | |
|---|---|---|---|---|---|
| Consonants | ㅍ(9) | ㅂ(2) | ㅅ/ㅆ(7) | ㅇ(1) | ㅎ(8) |
| | ㅎ/ㅃ(10) | ㅃ(4) | ㅈ(12) | ㄱ(3) | |
| | ㅍ(14) | ㅅ/ㅆ(5) | | ㄲ/ㅋ(16) | |
| | | ㄷ/ㄸ(6) | | | |
| | | ㅌ(13) | | | |

Table 2 shows classification according to the pronunciation positions in the oral cavity and frequency grades according to usage frequencies for the 12 Korean vowel keys to be allocated on the Korean keyboard according to the first to third exemplary embodiments of the present invention. In Table 2, the pronunciation position approaches the lips as it goes to the left, and the pronunciation position approaches the vocal chords as it goes to the right. The frequency grades are decreased as the number in the parentheses is increased, and the pronunciation position is low as it goes downward.

TABLE 2

| Pronunciation position | Lips◄ | | | ► Vocal Chords | | Pronunciation position |
|---|---|---|---|---|---|---|
| Vowels | ㅣ (2) | | ㅡ (3) | ㅗ (6) | ㅠ (12) | High |
| | ㅔ/ㅖ (9) | | ㅗ (4) | ㅛ (10) | | |
| | ㅐ/ㅒ (7) | ㅓ (5) | | ㅕ (8) | | |
| | | ㅏ (1) | | ㅑ (11) | Low | |

As shown in Table 1 and Table 2, since the vowels and the consonants are classified according to the pronunciation positions, the vowel keys and the consonant keys are arranged according to the pronunciation position in the oral cavity and/or the usage frequency on the keyboard according to the first to third exemplary embodiments of the present invention.

Referring to FIG. 1 to FIG. 3, the 14 consonant keys and the 12 vowel keys shown in Table 1 and Table 2 are allocated in the area of 3 rows and 10 columns of the Korean keyboard according to the first to third exemplary embodiments of the present invention, and punctuation marks are allocated to the 4 keys other than the 26 keys that correspond to the sun of the consonant keys and the vowel keys in the area of 3 rows and 10 columns. In this instance, the columns of the consonant keys and the vowel keys allocated on the Korean keyboard are determined by the pronunciation positions, and the rows thereof are determined by the usage frequencies.

The consonant keys are generally located on the left part of the Korean keyboard and the vowel keys are generally located on the right part thereof. In the area of 3 rows and 10 columns, the consonant keys are positioned from the first column to the fifth column and the vowel keys are positioned from the sixth column to the tenth column. The consonants and the vowels, the pronunciation positions of which are near the lips, are allocated to the keys that correspond to the index finger and the middle finger (i.e., the middle area of 3 rows and 10 columns). That is, the consonants the pronunciation positions of which are near the lips are allocated to the keys that are located in the right column of the left area, and the consonants the pronunciation positions of which are near the vocal chords are allocated to the keys that are generally located in the left column of the left area. The vowels the pronunciation positions of which are near the lips are allocated to the keys that are located in the left column of the right area, and the vowels the pronunciation positions of which are near the vocal chords are allocated to the keys that are generally located in the right column of the right area.

Also, regarding the keys that are located in the same column, the consonants and the vowels with a great usage frequency are allocated to the keys that are located in the middle row (the second row), the consonants and the vowels with a usage frequency next to the great usage frequency are allocated to the keys that are located in the upper row (the first row), and the consonants and the vowels with the least usage frequency are allocated to the keys that are located in the lower row (the third row).

As shown in FIG. 1 to FIG. 3, as to the consonant allocated positions, the Korean consonants are divided into 5 groups, and the groups are respectively allocated to the corresponding column from among the first to fifth columns.

In detail, the first group of "ㅁ", "ㅂ/ㅃ", and "ㅍ" the pronunciation positions of which are the nearest lips is allocated to the keys of the fifth column, and "ㅁ" having the greatest frequency in the first group is allocated to the key of the second row. The "ㅂ/ㅃ" having the second greatest frequency is allocated to the first row that is the upper row, and "ㅍ" having the least frequency is allocated to the key of the third row that is the lower row.

Next, "ㄴ", "ㄹ", "ㅅ/ㅆ", "ㄷ/ㄸ", and "ㅌ" the pronunciation positions of which are near the lips are allocated to the keys of the fourth and third columns. In this instance, since up to 3 consonants can be allocated to a single column when the pronunciation positions of "ㄴ", "ㄹ", "ㅅ/ㅆ", "ㄷ/ㄸ", and "ㅌ" are substantially similar with each other, "ㄴ", "ㄷ/ㄸ" and "ㅌ" that have similar phonetic values and hence may not be sequentially used are allocated to the second group, and "ㄹ" and "ㅅ/ㅆ" are allocated to the third group. The second group is allocated to the keys of the fourth column, and the third group is allocated to the keys of the third column. Since "ㄴ" and "ㄹ" have a great usage frequency in the second and third groups, they are allocated to the second row. The "ㅅ/ㅆ" and "ㄷ/ㄸ" having the next frequency are allocated to the first row, and "ㅌ" having the lowest frequency is allocated to the fourth column of the third row.

Next, "ㅈ/ㅉ", "ㅊ", "ㅇ", "ㄱ/ㄲ", "ㅋ", and "ㅎ" pronunciation positions of which are near the vocal chords are allocated to the keys of the second and first columns. In this instance, "ㅈ/ㅉ" and "ㅊ" having the same pronunciation position are allocated to the fourth group. Since "ㅇ", "ㄱ/ㄲ", and "ㅋ" have the same pronunciation position and two consonants are allocated to the fourth group, one consonant of "ㅇ", "ㄱ/ㄲ", and "ㅋ" is allocated to the fourth group. In this instance, since "ㄱ/ㄲ" and "ㅋa" have similar phonetic values and may not be sequentially used, "ㄱ/ㄲ" and "ㅋ" are allocated to the same group (the fifth group). Therefore, "ㅇ" is allocated to the fourth group, and "ㅎ" is allocated to the fifth group. The fourth group and the fifth group are respectively allocated to the second column and the first column. The "ㅇ" and "ㄱ/ㄲ" having the greatest usage frequency in the fourth and fifth groups are allocated to the second row, "ㅈ/ㅉ" and "ㅎ" having the next usage frequency are allocated to the first row, and "ㅊ" and "ㅋ" having a low usage frequency are allocated to the third row.

Accordingly, the consonants can be allocated to the left part (i.e., the part covered by the left hand) of the Korean keyboard depending on the pronunciation position and the usage frequency according to the first to third exemplary embodiments of the present invention.

Next, regarding the vowels, "ㅠ" having the lowest usage frequency is allocated to the key of the third row of the third column (i.e., the column in which the third group is allocated) that is an empty space in the area in which the consonants are positioned, and "ㅣ", "ㅏ", "ㅡ", and "ㅗ" having the great usage frequency are allocated to the keys of the second row. In this instance, since the pronunciation positions of "ㅣ", "ㅏ", "ㅡ", and "ㅗ" are near the lips in their orders, "ㅣ", "ㅏ", "ㅡ", and "ㅗ" are respectively allocated to the keys of the seventh, eighth, ninth, and tenth columns.

Referring to FIG. 1 again, diphthongs "ㅑ", "ㅕ", and "ㅛ" having a low usage frequency are allocated to the same column as that of "ㅏ", "ㅓ", and "ㅗ", and 4 punctuation marks are allocated to the third row in the first exemplary embodiment of the present invention. The "ㅖ/ㅔ", "ㅒ/ㅐ", and "ㅓ" the pronunciation positions of which are near the lips are allocated to the sixth and seventh columns that are on the left side of the Korean keyboard. In this instance, "ㅓ" having a great usage frequency is allocated to the second row of the sixth column, and "ㅖ/ㅔ" and "ㅒ/ㅐ" are allocated to the sixth and seventh columns of the first row. Also, the "ㅜ" is allocated to the first row of the ninth column to which no diphthong is allocated and to which "ㅡ" is allocated.

Referring to FIG. 2, since the usage frequencies of the diphthongs "ㅑ", "ㅕ", and "ㅛ" are low, the diphthongs are allocated to the third row that is the lower row and the four punctuation marks are allocated to the positions that correspond to the ring finger and the little finger of the right hand in the second exemplary embodiment of the present invention. Therefore, differing from the first exemplary embodiment, "ㅜ" is allocated to the eighth column of the first row, and "ㅕ", "ㅑ", and "ㅛ" are allocated to the sixth to eighth columns of the third row. In this instance, the positions of "ㅕ", "ㅑ", and "ㅛ" are interchangeable.

Referring to FIG. 3, in the third exemplary embodiment of the present invention, the diphthongs "ㅑ", "ㅕ", and "ㅛ" are allocated to the first column in the vowel area (i.e., the sixth column), and 4 punctuation marks are allocated to the third row. Therefore, differing from the first exemplary embodiment, "ㅛ", "ㅕ", and "ㅛ" are allocated to the first to third rows of the sixth column, and their positions are interchangeable. The "ㅓ" that has a similar pronunciation position of "ㅏ" is allocated to the first row of the eighth column in which "ㅏ" is positioned, and "ㅜ" that has a similar pronunciation position of "ㅗ" is allocated to the first row of the tenth column in which "ㅗ" is positioned. The "ㅖ/ㅔ" and "ㅒ/ㅐ" are respectively allocated to the sixth and ninth columns.

An English character allocating method according to fourth and fifth exemplary embodiments of the present invention will now be described in detail with reference to FIG. 4 and FIG. 5. In the fourth and fifth exemplary embodiments of the present invention, the English characters are allocated in the area of 3 rows and 10 columns on the keyboard of the input device.

FIG. 4 and FIG. 5 respectively show an English keyboard of an input device according to fourth and fifth exemplary embodiments of the present invention.

In the case of the Qwerty keyboard, the English alphabet has 21 consonants and 5 vowels. The English capital letters are input by combining the small letter key of the corresponding English capital letter and the "SHIFT" key, and the reverse operation is also possible.

In the case of the English characters, each English character is not pronounced as the same phoneme in words, differing from Korean characters, and it is possible to regard a phoneme that is expressed with the greatest frequency from a single English character in an English sentence as the representative phoneme of the English character and classify the same according to the pronunciation position as shown in Table 3. Table 3 shows orders according to classification caused by the pronunciation position in the oral cavity and usage frequency for the representative phonemes of the corresponding characters of the 21 English consonants to be allocated to the English keyboard of the character input device according to the fourth and fifth exemplary embodiments of the present invention. In Table 3, the pronunciation position approaches the lips as it goes to the left, and the pronunciation position approaches the vocal chords as it goes to the right. The frequency order is lowered as the lumber in the parentheses becomes greater.

TABLE 3

| Pronunciation position | Lips◄ | | | ►Vocal Chords | |
|---|---|---|---|---|---|
| Consonants | P (8) | F (13) | R (1) | J (20) | C (6) | H (10) |
| | M (9) | V (17) | T (2) | | G (11) | W (15) |
| | B (12) | | N (3) | | Y (14) | |
| | | | S (4) | | K (16) | |
| | | | L (5) | | | |
| | | | Z (19) | | | |

The letters "Q" and "X" in Table 3 have no specified pronunciation positions since it is difficult to specify the representative phonemes for "Q" and "X". Therefore, the letters "Q" and "X" are freely allocated in the fourth and fifth exemplary embodiments of the present invention. The letters "Y" and "W" are determined to be semivowels and are allocated to the area where the vowels are allocated.

Table 4 shows orders according to classification caused by the pronunciation position in the oral cavity and usage frequency for the representative phonemes of the 5 English vowels to be allocated to the English keyboard of the character input device according to the fourth and fifth exemplary embodiments of the present invention. In Table 4, the pronunciation position approaches the lips as it goes to the left, and the pronunciation position approaches the vocal chords as it goes to the right. The frequency order is lowered as the number in the parentheses becomes greater, and the pronunciation position is lowered as it goes downward.

TABLE 4

| Pronunciation Position | Lips◄ | ►Vocal Chords | Pronunciation Position |
|---|---|---|---|
| Vowels | I(3) | U(5) | High |
|  | E(1) | O(4) |  |
|  |  | A(2) | Low |

As shown in Table 3 and Table 4, since the vowels and the consonants can be classified according to the pronunciation position, the vowel and consonant keys are arranged on the English keyboard according to the fourth and fifth exemplary embodiments of the present invention depending on the pronounced position in the oral cavity and/or the usage frequency.

Referring to FIG. 4 and FIG. 5, in the area of 3 rows and 10 columns of the English keyboard according to the fourth and fifth exemplary embodiments of the present invention, 21 consonant keys and 5 vowel keys shown in Table 3 and Table 4 are allocated, and punctuation marks can be allocated to the residual 4 keys other than the 26 keys. In this instance, in a similar manner of the first to third exemplary embodiments, the column on the English keyboard in which the consonant key and the vowel key is positioned is determined according to the pronunciation position, and the row on the English keyboard is determined according to the usage frequency.

In detail, regarding the vowel allocated position, as shown in FIG. 4 and FIG. 5, the "I", "E", "A", "U" and "O" are allocated in the middle row in the right area of the English keyboard, that is, they are allocated to the keys that are provided in the second row of the sixth to tenth columns. In this instance, the "I" and "E" the pronunciation positions of which are near the lips are allocated in the sixth and seventh columns, and the "A", "U" and "O" the pronunciation positions of which are near the vocal chords are allocated to the eighth to tenth columns. Here, the positions of "I" and "E" and the positions of "A", "U", and "O" are interchangeable.

Next, regarding the consonants, the first group of "P", "M", and "B" the pronunciation positions of which are the nearest the lips are allocated to the keys in the fifth column, and "P" is allocated in the second row provided in the middle since "P" has the greatest frequency in the first group. "M" having the second greatest frequency is allocated to the key of the first row provided in the upper side, and "B" having the least frequency is allocated to the key of the third row.

Next, "F" and "V" the pronunciation positions of which are near the lips are allocated to the second group, and since the two consonants form a group and each usage frequency is low, the second group is allocated to the sixth column in which "I" is allocated to the second row. Since "F" has a greater frequency than that of "V" in the second group, "F" is allocated to the first row of the sixth column, and "V" is allocated to the third row thereof.

Next, "R", "T", "N", "S", "L", "D", and "Z" the pronunciation positions of which are near the lips are allocated to the keys that are provided to the entire rows of third and fourth columns and the key that is provided to one row of the second column. In this instance, "T" and "D" that are pronounced similarly and have a low probability of sequential use are allocated to the same group (i.e., the third group), and "S" and "Z" are allocated to the same group (i.e., the fourth group) in a like manner. Since the same finger uses the keys that are positioned in the same column, the keys are allocated so that the usage frequency of the keys in the same column controlled by the respective fingers may be similar. In detail, since the usage frequency of the group the pronunciation position of which is distant from the lips is relatively lower than that of the group of "R", "T", "N", "S", "L", "D", and "Z", "R" having the greatest usage frequency is allocated to the second row of the second column. Since "L" is sequentially used together with "T" or "D" many times, "L" differing from "T" and "D" is allocated to the fourth group together with "S" and "Z", and "N" is allocated to the third group. Therefore, one of the third group and the fourth group is allocated to the third column, and the residual group is allocated to the fourth column. In this instance, since "S" and "P" are sequentially used in many cases and the index finger is allocated to "P", "S" can be allocated to the column corresponding to the finger other than the index finger. That is, the fourth group can be allocated to the third column, and the third group can be allocated to the fourth column.

Next, "J", "C", "G", "K", and "H" the pronunciation positions of which are farthest from the lips are allocated to the first and second columns. In this instance, "J" the pronunciation position of which is the nearest the lips is allocated to the same fifth group of "R", and "H" the pronunciation position of which is the farthest from the lips is allocated to the sixth group. The "G" and "K" are allocated to the sixth group and "C" is allocated to the fifth group so as to allocate similarly pronounced "G" and "K" to the same group. Therefore, the fifth group is allocated to the second column, and the sixth group is allocated to the first column. In this instance, since "C" has the usage frequency greater than that of "J" in the fifth group, "C" is allocated to the first row and "J" is allocated to the third row. The "H" having the greatest usage frequency in the sixth group is allocated to the second row, and "G" and "K" are respectively allocated to the first and third rows.

Accordingly, the vowels and the consonants the pronunciation of which can be determined can be allocated to the English keyboard.

Referring to FIG. 4, in the fourth exemplary embodiment, "Q" and "X" pronunciation of which is not determined and "Y" and "W" that are semivowels are allocated to the first row in the vowel area, and punctuation marks are allocated to the third row. In this instance, "X", "Y", "W", and "Q" are illustrated in FIG. 4 to be allocated to the seventh, eighth, ninth, and tenth columns of the first row, and their positions are interchangeable.

Referring to FIG. 5, in the fifth exemplary embodiment, "Q" and "X" the pronunciation of which is not determined and "Y" and "W" that are semivowels are allocated to the different rows in the vowel area. In this instance, since the usage frequencies of "Y" and "W" are greater than those of "Q" and "X", "Y" and "W" are allocated to the first row of the seventh and eighth columns, and "X" and "Q" are allocated to the third row of the seventh and eighth columns. Positions of "Y" and "W" are interchangeable, and positions of "X" and "Q" are also interchangeable.

Accordingly, in the first to fifth exemplary embodiments of the present invention, the characters having the same pronunciation position are allocated to the same column and the characters that are allocated to the same column are arranged in consideration of their input frequencies. It is rare to sequentially generate sounds having the same pronunciation position, and hence, sequential use of the same finger to press the keys on the keyboard when the sound of the same pronunciation position is allocated to the same column can be reduced according to the first to fifth exemplary embodiments of the present invention.

Next, a method for allocating punctuation marks to the area of 3 rows and 10 columns of the Korean or English keyboard according to the first to fifth exemplary embodiments of the present invention will be described in detail with reference to FIG. 1 to FIG. 5.

Referring to FIG. 1 to FIG. 5, according to another exemplary embodiment of the present invention, the punctuation marks of ",/;", "./:", "!/'" and "?/"" having a great usage frequency are allocated to the area of 3 rows and 10 columns. In this instance, ",", ".", "!" and "?" having a great usage frequency are allocated in a format not using the "SHIFT" key, and ";", ":", "'" and """ having a lesser usage frequency are allocated in the format using the "SHIFT" key. The "," and ";" having a relatively similar function are allocated to the same key, and "." and ":" are allocated to the same key.

Referring to FIG. 1, FIG. 3, and FIG. 4, in other exemplary embodiments of the first, third, and fourth exemplary embodiments of the present invention, the punctuation marks of "!/'", "?/"", ",/;", and "./:" are respectively allocated to the keys that are positioned in the seventh, eighth, ninth, and tenth columns of the third row. Here, their positions are interchangeable.

Referring to FIG. 2 and FIG. 5, in other exemplary embodiments of the second and fifth exemplary embodiments of the present invention, ",/;" and "./:" having a great usage frequency are allocated to the keys that are positioned in the first row of the ninth and tenth columns, and "!/'" and "?/"" having a lesser usage frequency are allocated to the keys that are positioned in the third row of the ninth and tenth columns. In this instance, the positions of ",/;" and "./:" are interchangeable with each other, and the positions of "!/'" and "?/"" are also interchangeable with each other.

Next, a method for allocating numbers to the Korean or English keyboard according to the first to fifth exemplary embodiments of the present invention will be described with reference to FIG. 1 to FIG. 5.

Referring to FIG. 1 to FIG. 5, in other exemplary embodiments of the first to fifth exemplary embodiments of the present invention, the numbers from 0 to 9 are allocated to the keys that are positioned in an area beyond the area of 3 rows and 10 columns on the Korean or English keyboard (hereinafter, a "numerical row area"). In detail, one of a group including odd numbers and a group including even numbers among the numbers from 0 to 9 is allocated to the first to fifth columns in the numerical row area, and the other is allocated to the sixth to tenth column therein. FIG. 1 to FIG. 5 show that the group including even numbers is allocated to the first to fifth columns and the other group including odd numbers is allocated to the sixth to tenth columns.

Accordingly, the user can quickly input the numbers since he can alternately use both hands to input sequential numbers.

In FIG. 1 to FIG. 5, the number keys are allocated to the numerical row area in the direction from the middle area to the outer area and in a number-ascending format. In detail, the number keys are allocated to the first to tenth columns in the order of 0, 8, 6, 4, 2, 1, 3, 5, 7, and 9.

Also, according to another exemplary embodiment of the present invention, the Korean or English characters, numbers, and marks other than the punctuation marks are allocated in a similar manner to that of the standard keyboard. However, the marks that are positioned in the area of 3 rows and 10 columns on the standard keyboard since the punctuation marks are allocated to the area of 3 rows and 10 columns are allocated in a different manner to that of the standard keyboard.

In detail, as shown in FIG. 1 to FIG. 5, "@", "#", "$", "%", "^", "&" and "*" are allocated to the keys to which 2, 3, 4, 5, 6, 7, and 8 are allocated in a like manner of the standard keyboard. Since "(" is positioned on the left and ")" is positioned on the right in the case of using "(" and ")", "(" is allocated to the left key of the keys to which 9 and 0 are allocated, and ")" is allocated to the right key therebetween. Referring to FIG. 1 to FIG. 5, "(" is allocated to the key to which 0 is allocated, and ")" is allocated to the key to which 9 is allocated.

Next, "~/`", "−", "=/+", "\|", "[/{", and "]/}" can be allocated to the same positions as those of the standard keyboard. From among "<" and ">" that are allocated to the area of 3 rows and 10 columns on the standard keyboard, "<" is allocated to the key to which 1 is allocated, and ">" is allocated to the same column as "<", that is, the key to which "−" is allocated, since ">" is sequentially used with "<" in many cases. Also, "/" that is allocated to the area of 3 rows and 10 columns in the standard keyboard is allocated to the key to which "'/"" is allocated on the standard keyboard, that is, the key that is adjacent in the row direction from the tenth column of the second row in the area of 3 rows and 10 columns, and "_" that is allocated to the same key as "−" on the standard keyboard is allocated to the same key as "/".

Next, a Korean/English character allocation method according to sixth to eighth exemplary embodiments of the present invention will be described with reference to FIG. 6 to FIG. 8. In FIG. 6 to FIG. 8, the Korean/English characters are allocated to the area of 3 rows and 10 columns on the Korean/English keyboard.

FIGS. 6 to 8 respectively show a Korean/English keyboard of an input device according to sixth to eighth exemplary embodiments of the present invention.

Referring to FIG. 6, the Korean/English character allocation method according to the sixth exemplary embodiment of the present invention allocates the Korean characters to the area of 3 rows and 10 columns according to the Korean character allocation method of FIG. 1 and allocates the English characters to the area of 3 rows and 10 columns according to the English character allocation method of FIG. 4.

Referring to FIG. 7, the Korean/English character allocation method according to the seventh exemplary embodiment of the present invention allocates the Korean characters to the area of 3 rows and 10 columns according to the Korean character allocation method of FIG. 2 and allocates the English characters to the area of 3 rows and 10 columns according to the English character allocation method of FIG. 5.

Referring to FIG. 8, the Korean/English character allocation method according to the eighth exemplary embodiment of the present invention allocates the Korean characters to the area of 3 rows and 10 columns according to the Korean character allocation method of FIG. 3 and allocates the English characters to the area of 3 rows and 10 columns according to the English character allocation method of FIG. 4.

Accordingly, according to the sixth to eighth exemplary embodiments of the present invention, the Korean characters and the English characters are arranged according to the pronunciation positions and their input frequencies, thereby reducing sequential use of the same finger on the keyboard.

As shown in FIG. 6 to FIG. 8, when the third group of "N", "T", and "D" are allocated to the fourth column and the fourth group of "L", "S", and "Z" are allocated to the third column in the sixth to eighth exemplary embodiments, the Korean consonant and the English consonant having similar phonetic values can be allocated to the same column. Accordingly, since the Korean consonant and the English consonant having similar phonetic values are allocated to the same column, when the user memorizes one of the Korean consonant and the English consonant, he can estimate the column in which the other consonant is provided. However, even though the Korean consonant and the English consonant having similar phonetic values can be allocated to the same column, they may not be allocated to the same key, as shown in FIG. 6 to FIG. 8. Therefore, a Korean/English character allocating method in order for the phonetic values of the Korean consonant and the English consonant allocated to the same key to be similar with each other will now be described with reference to FIG. 9 to FIG. 11.

FIGS. 9 to 11 respectively show a Korean/English keyboard of an input device according to ninth to eleventh exemplary embodiments of the present invention.

The Korean/English character allocation method according to the ninth exemplary embodiment of the present invention controls the Korean consonant based on the English consonant by using the Korean/English character allocation method according to the sixth exemplary embodiment of the present invention shown in FIG. 6 when the Korean consonant and the English consonant are differently pronounced on the Korean/English keyboard on which the Korean/English characters are allocated. That is, referring to FIG. 6, the positions of "ㅎ", "ㅅ", "ㄷ", "ㅂ", "ㅣ", "ㄹ", "ㄴ", and "ㅁ" are controlled since the phonetic value between "G" and "ㅎ", the phonetic value between "L" and "ㅅ", the phonetic value between "N" and "ㄷ", the phonetic value between "M" and "ㅂ", the phonetic value between "H" and "ㄱ", the phonetic value between "S" and "ㄹ", the phonetic value between "T" and "ㄴ", and the phonetic value between "P" and "ㅁ" that are respectively allocated to the same key are different.

In detail, as shown in FIG. 9, the Korean/English character allocation method according to the ninth exemplary embodiment of the present invention allocates "ㅎ" and "H" to the same key, "ㅅ" and "S" to the same key, "ㄷ" and "T" to the same key, "ㅂ" and "P" to the same key, "ㄱ" and "G" to the same key, "ㄹ" and "L" to the same key, "ㄴ" and "N" to the same key, and "ㅁ" and "M" to the same key.

In a like manner, as shown in FIG. 10 and FIG. 11, the Korean/English character allocation method according to the tenth and eleventh exemplary embodiments of the present invention controls the Korean consonant based on the English consonant on the Korean/English keyboard on which the Korean/English characters are allocated as shown in FIG. 9 according to the Korean/English character allocation method of the seventh and eighth exemplary embodiments shown in FIG. 7 and FIG. 8.

It has been described in the exemplary embodiments shown in FIG. 9 to FIG. 11 that the position of the Korean consonant is controlled on the keyboard of FIG. 6 to FIG. 8 so that the phonetic values may be similar with reference to the English consonant, and it is also possible to control the position of the English consonant on the keyboard of FIG. 6 to FIG. 8 with reference to the Korean consonant. In this instance, the case of inputting the English words on the keyboard with the controlled position of the English consonant with reference to the Korean consonant may have a worse English input efficiency compared to the case of inputting the English words on the keyboard with the controlled position of the Korean consonant with reference to the English consonant. However, it is desirable to control the position of the Korean consonant with reference to the English consonant in consideration of the fact that most countries adopt the Roman keyboard.

According to the ninth to eleventh exemplary embodiments of the present invention, since the Korean consonant and the English consonant having the similar pronunciation are allocated to the same key, the user can estimate the position of the other consonant when he memorizes one consonant position from among the positions of the Korean consonant and the English consonant.

The Korean keyboard, the English keyboard, and the Korean/English keyboard having the area of 3 rows and 10 columns have been described in the first to eleventh exemplary embodiments of the present invention. A method for allocating the Korean/English characters to a small keyboard of 4 rows and 3 columns will now be described with reference to FIG. 12 to FIG. 14.

FIGS. 12 to 14 respectively show a Korean/English keyboard of an input device according to twelfth to fourteenth exemplary embodiments of the present invention. In the twelfth to fourteenth exemplary embodiments of the present invention, the Korean/English characters are allocated to the small keyboard.

Referring to FIG. 12, the Korean/English character allocation method according to the twelfth exemplary embodiment of the present invention allocates the Korean/English character that is allocated to the same column on the Korean/English keyboard that is allocated according to the ninth exemplary embodiment shown in FIG. 9 to the same key on the small keyboard.

In FIG. 12, the fifth column of FIG. 9 is allocated to the key to which 1 is allocated on the small keyboard, the fourth column is allocated to the key to which 4 is allocated, the third column is allocated to the key to which 7 is allocated, the sixth column is allocated to the key to which 2 is allocated, the seventh column is allocated to the key to which 5 is allocated, the second column is allocated to the key to which 8 is allocated, the first column is allocated to the key to which 0 is allocated, the eighth column is allocated to the key to which 3 is allocated, the ninth column is allocated to the key to which 6 is allocated, and the tenth column is allocated to the key to which 9 is allocated. The "*" and "#" are respectively allocated to the first column of the fourth row and the third column of the fourth row on the small keyboard.

Here, the convenience of inputting can be improved when the Korean diphthongs are grouped to be allocated to the same key in a like manner of the thirteenth exemplary embodiment shown in FIG. 13 or when the positions of the diphthongs are changed so as to arrange a single vowel and a similar diphthong on the same key in a like manner of the fourteenth exemplary embodiment shown in FIG. 14. Also, no keys can be allocated to the vowels such as "ㅒ" and "ㅖ" since the vowels have a low usage frequency and can be generated by the combination of "ㅑ"+"ㅣ" and "ㅕ"+"ㅣ" respectively.

In English speaking countries including the USA, the personalized number (PN) expression method for matching the lumbers and the English characters on the keyboard of 4 rows and 3 columns is used so as to reduce inconvenience of memorizing lumbers in the case of expressing numbers such as a telephone lumber. For example, when the numbers are matched with the English characters as shown in Table 5, the telephone number 800-KEY-BOARD means 800-539-26273.

TABLE 5

| English characters | Numbers |
|---|---|
|  | 0 |
|  | 1 |
| A B C | 2 |
| D E F | 3 |
| G H I | 4 |
| J K L | 5 |
| M N O | 6 |
| P Q R S | 7 |
| T U V | 8 |
| W X Y Z | 9 |

A method for supporting the PN expression method according to the fifteenth exemplary embodiment will now be described.

When the input device according to the exemplary embodiment of the present invention is used for a communication terminal, the input device provides a general English input mode and a PN input mode. When the mode of the input device is switched to the PN input mode and the user inputs a character expressed by the PN to the input device, the input character can be switched to the number in the conventional personal telephone number format. In this instance, the user inputs the character through a character input method.

For example, regarding using the keyboard of 4 rows and 3 columns according to the twelfth exemplary embodiment of the present invention, "H" is input when the user presses once the key at which "0" is positioned, "J" is input when he presses the same twice, and "K" is input when he presses the same three times, as shown in Table 6. Therefore, "KEY" is input when the user presses the key at which "0" is positioned three times quickly, presses the key at which "5" is positioned once quickly, and presses the key at which "3" is positioned twice quickly. When the user presses the calling button of the terminal, "KEY" is converted into "053" which is the real number of the PN.

TABLE 6

| | K | E | Y |
|---|---|---|---|
| 1 | Firstly press the key of 0 once quickly (H) | Press the key of 5 once quickly (E) | Firstly press the key of 3 once quickly (A) |
| 2 | Secondly press the key of 0 once quickly (J) | | Secondly press the key of 3 once quickly (Y) |
| 3 | Thirdly press the key of 0 once quickly (K) | | |

Next, referring to Table 7 to Table 14, the efficiencies between the case of inputting the Korean and English characters by using the Korean/English keyboard shown in FIG. 6 and the case of inputting the Korean and English characters by using the conventional dual type of Korean keyboard and the Qwerty English keyboard will be compared, and the efficiencies between the case of inputting the Korean and English characters by using the small keyboard shown in FIG. 12 and the case of inputting the Korean and English characters by using the conventional small keyboard will be compared.

TABLE 7

| Measured items |
|---|
| Distribution of alternately using the left hand and right hand on sequentially input characters |
| Measured targets |

| | Korean inputs | | English inputs | | Korean inputs | | English inputs | |
|---|---|---|---|---|---|---|---|---|
| | Prior art | FIG. 6 | Prior art | FIG. 6 | Prior art | FIG. 12 | Prior art | FIG. 12 |
| Measured values | 68% | 68% | 47% | 56% | 54% | 78% | 46% | 63% |

As can be known from Table 7, regarding the distribution for alternately using the right finger and the left finger to input the sequential characters on the conventional keyboard and the keyboard according to the exemplary embodiment of the present invention, the distribution according to the exemplary embodiment of the present invention has greater values than the distribution according to the usage of the conventional small keyboard. When the user inputs the characters by alternately using the right hand and the left hand according to the exemplary embodiment of the present invention, the input efficiency is increased and the burden caused by the inputting process is divided to both hands.

TABLE 8

Measured items
Distribution of using the rows in the middle of the keyboard
Measured targets

| | Korean inputs | | English inputs | | Korean inputs | | English inputs | |
|---|---|---|---|---|---|---|---|---|
| | Prior art | FIG. 6 | Prior art | FIG. 6 | Prior art | FIG. 12 | Prior art | FIG. 12 |
| Measured values | 52% | 61% | 28% | 52% | 19% | 29% | 30% | 30% |

Referring to FIG. 8, the usage distribution of the central row on the keyboard according to the exemplary embodiment of the present invention is greater than that of the conventional keyboard. It is easier to input the characters as the frequency of inputting the characters in the central row that is the basic position of fingering becomes greater according to the exemplary embodiment of the present invention.

TABLE 9

Measured Items
Movement distribution between upper
and lower rows when inputting
sequential characters
Measured targets

| | Korean input | | English input | |
|---|---|---|---|---|
| | Prior art | FIG. 6 | Prior art | FIG. 6 |
| Measured values | 0.3% | 0.1% | 5.4% | 1.5% |

As can be known from Table 9, the movement distribution between the upper row and the lower row is low when the user inputs sequential characters on the keyboard according to the exemplary embodiment of the present invention compared to the conventional keyboard. When the distribution of moving to the upper row or the lower row with reference to the central row that is the basic position of fingering while inputting the characters, the character inputting process is inconvenient and the input efficiency is degraded, but according to the exemplary embodiment of the present invention, the movement distribution of continuous characters between the upper row and the lower row is reduced.

TABLE 10

Measured Items
Distribution of using the same keys
when inputting sequential characters
on the small keyboard of an area of
4 rows and 3 columns
Measured Targets

| | Korean input | | English input | |
|---|---|---|---|---|
| | Prior art | FIG. 12 | Prior art | FIG. 12 |
| Measured Values | 2% | 3% | 8% | 5% |

As the distribution of using the same key when sequentially inputting the characters on the small keyboard becomes lower, additional key inputting or required time for distinguishing the characters while inputting the characters is advantageously reduced. Referring to Table 10, the distribution of using the same key in the case of sequentially inputting the English characters on the keyboard according to the exemplary embodiment of the present invention is low, and the distribution for sequentially inputting the Korean characters on the conventional keyboard is a little less than the distribution for sequentially inputting the Korean characters on the keyboard according to the exemplary embodiment of the present invention, which is because the rate of using the same key in the case of inputting the vowel is reduced since the vowel inputting method of the conventional keyboard inputs the vowels other than "—" and "ㅣ" by combining "—", "ㅣ", or "•". However, the method combining "—", "ㅣ", or "•" increases the key inputting frequency in the case of inputting the vowels to thus reduce the input efficiency.

TABLE 11

Measured items
Number of key presses when
inputting one character on the small
keyboard of the area of 4 rows and
3 columns
Measured targets

|  |  | Korean input | | English input | |
|---|---|---|---|---|---|
|  |  | Prior art | FIG. 12 | Prior art | FIG. 12 |
| Measured values | Press once | 55% | 67% | 40% | 73% |
|  | Press twice | 38% | 27% | 25% | 20% |
|  | Press three times | 7% | 6% | 25% | 6% |

When the first arranged character is input by pressing the same key once on the small keyboard, the second arranged character is input by pressing the same key twice, and the third arranged character is input by pressing the same key three times, as the number of instances of pressing the key twice is greater than the number of instances of pressing the key three times and the number of instances of pressing the key once is greater than the number of instances of pressing the key twice, the total number of key presses is reduced to increase the input efficiency. Referring to Table 11, the keyboard according to the exemplary embodiment of the present invention allows the user to have fewer instances of pressing the key three times and twice than that of the conventional keyboard, and increases the rate for the user to press the key once, thereby increasing input efficiency.

TABLE 12

Measured items
Number of key presses when inputting
an entire sentence on the small keyboard
of the area of 4 rows and 3 columns
Measured targets

| Korean input | | English input | |
|---|---|---|---|
| Prior art | FIG. 12 | Prior art | FIG. 12 |
| Measured values | 92.1% | | 70.2% |

Table 12 shows the ratio between the number of presses of keys on the keyboard according to the exemplary embodiment of the present invention and the number of presses of keys on the conventional keyboard when the first arranged character is input by pressing the same key once on the small keyboard, the second arranged character is input by pressing the same key twice, and the third arranged character is input by pressing the same key three times. As the number of key presses required for inputting the given sentence is reduced, the burden of the hand for inputting the sentence and the required time are reduced to thereby increase efficiency, and the keyboard according to the exemplary embodiment of the present invention increases the input efficiency since it reduces the entire number of key presses when inputting the entire sentence compared to the conventional keyboard.

TABLE 13

Measured items
Difference of distribution of using both
hands on the normal keyboard (Except
usage of space bar)
Measured targets

|  | Korean input | | English input | | |
|---|---|---|---|---|---|
|  | Prior art | FIG. 6 | Prior art | FIG. 6 | |
| Measured values | 20% | 16% | 17% | 20% | (A) Usage frequency of the most-used finger |
|  | 1% | 5% | 1% | 5% | (B) Usage frequency of the least-used finger |
|  | 20 | 3.2 | 17 | 4 | (A)/(B) |

It is more efficient to equivalently divide the burden of inputting characters to the fingers of both hands on the normal keyboard, and referring to Table 13, the keyboard according to the exemplary embodiment of the present invention has a ratio of usage frequency of the most finger to usage frequency of the least-used fingers that is much less than that of the conventional keyboard and thereby has greater input efficiency.

TABLE 14

Measured items
Distribution for the sequential
characters positioned in different
rows on the normal keyboard
Measured targets

|  | Korean input | | English input | |
|---|---|---|---|---|
|  | Prior art | FIG. 6 | Prior art | FIG. 6 |
| Measured values | 2.3% | 1.8% | 8.3% | 6.3% |

The input efficiency is reduced when the user sequentially inputs characters while moving between different rows on the keyboard, and referring to Table 14, the keyboard according to the exemplary embodiment of the present invention has a low distribution of positioning sequential input characters in different rows and thereby increases the input efficiency.

According to the exemplary embodiment of the present invention, a user who begins using a keyboard or who is skilled in using the same can quickly input characters and reduce the error frequency of inputting characters through the easy characters inputting process. The user can further alternately use the right hand and the left hand to sequentially input characters because of the characters arrangement having the considered pronunciation position, can use different fingers in the case of using the same hand, and can increase the character input efficiency since the movement probability between the upper columns and the lower columns is low.

According to another exemplary embodiment of the present invention, since the character keys are allocated based on the pronunciation positions within the oral cavity, the alternate finger usage frequency such as the alternate hand usage frequency of the right hand and the left hand is increased to increase the convenience and efficiency of character inputting. Since characters that are from different languages but have the same pronunciation position use the same key in many cases, efficient character inputting can occur even when the user uses the keys while switching between the Korean usage mode and the English usage mode.

According to the other exemplary embodiment of the present invention, when the user learns one of the Korean and English keyboards, he can easily learn the other keyboard since the keys are allocated on the keyboard based on pronunciation.

According to the other exemplary embodiment of the present invention, the user can input characters while using the small keyboard of 4 rows and 3 columns in a like manner of the keyboard of 3 rows and 10 columns, and hence uniformity among various keyboards is maintained.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for allocating characters to a keyboard including an area of 3 rows and 10 columns, the method comprising:
    dividing at least some of a plurality of consonants into a plurality of consonant groups according to pronunciation positions within the oral cavity;
    allocating the consonant groups to corresponding columns in a first area of the area of 3 rows and 10 columns; and
    allocating a plurality of vowels to a second area of the area of 3 rows and 10 columns,
    wherein the first area is one of a left area and a right area of the area of 3 rows and 10 columns, and the second area is the other one thereof,
    wherein
    the allocating of the consonant groups to corresponding columns includes allocating the respective consonant groups in the order of positions that correspond to the little finger to positions that correspond to the index finger of the first area; and
    the pronunciation position of the consonant group allocated to the position that corresponds to the index finger is nearer the lips than that of the consonant group allocated to the position that corresponds to the little finger.

2. The method of claim 1, further comprising
    allocating a plurality of consonants belonging to the respective consonant groups to corresponding rows according to usage frequency.

3. The method of claim 2, further comprising:
    allocating the consonant having the greatest usage frequency from among a plurality of consonants belonging to the respective consonant groups to the second row in the area of 3 rows and 10 columns;
    allocating the consonant having the second greatest usage frequency from among the consonants to the first row of the area of 3 rows and 10 columns; and
    allocating the residual consonants to the third row of the area of 3 rows and 10 columns.

4. The method of claim 1, wherein
    the dividing further includes dividing the consonants into the plurality of consonant groups so as to reduce the frequency of sequential input in the same column.

5. A method for allocating characters to a keyboard including an area of 3 rows and 10 columns, the method comprising:
    dividing at least some of a plurality of consonants into a plurality of consonant groups according to pronunciation positions within the oral cavity;
    allocating the consonant groups to corresponding columns in a first area of the area of 3 rows and 10 columns; and
    allocating a plurality of vowels to a second area of the area of 3 rows and 10 columns, wherein
    the first area is one of a left area and a right area of the area of 3 rows and 10 columns, and the second area is the other one thereof,
    further comprising
    allocating "ㄲ", "ㄸ", "ㅃ", "ㅆ", and "ㅉ" to the same positions as those of "ㄱ", "ㄷ", "ㅂ", "ㅅ", and "ㅈ"; and
    wherein the plurality of consonant groups include a first consonant group of "ㅂ", "ㅁ", and "ㅍ", a second consonant group of "ㄷ", "ㄴ", and "ㅌ", a third consonant group of "ㅅ" and "ㄹ", a fourth consonant group of "ㅈ", "ㅇ", and "ㅊ", and a fifth consonant group of "ㅎ", "ㄱ", and "ㅋ".

6. The method of claim 5, wherein
    the allocating of a plurality of vowels includes allocating "ㅠ" from among the vowels to the column to which the third consonant group is allocated.

7. The method of claim 1, wherein
    the allocating of a plurality of vowels includes:
    allocating "ㅣ", "ㅏ", "ㅡ", and "ㅗ" having a large usage frequency from among the single vowels of the plurality of vowels to the second row of the 3 rows and 10 columns; and
    allocating "ㅣ", "ㅏ", "ㅡ", and "ㅗ" to corresponding columns according to the pronunciation positions within the oral cavity.

8. A method for allocating characters to a keyboard including an area of 3 rows and 10 columns, the method comprising:
    dividing at least some of a plurality of consonants into a plurality of consonant groups according to pronunciation positions within the oral cavity;
    allocating the consonant groups to corresponding columns in a first area of the area of 3 rows and 10 columns; and allocating a plurality of vowels to a second area of the area of 3 rows and 10 columns, wherein the first area is one of a left area and a right area of the area of 3 rows and 10 columns, and the second area is the other one thereof, wherein the plurality of consonant groups include a first consonant group of "F" and "V", a second consonant group of "P", "M", and "B", a third consonant group of "T", "N", and "D", a fourth consonant group of "S", "L", and "Z", a fifth consonant group of "R", "C", and "J", and a sixth consonant group of "H", "G", and "K".

9. A method for allocating characters to a keyboard including an area of 3 rows and 10 columns, the method comprising:

dividing at least some of a plurality of consonants into a plurality of consonant groups according to pronunciation positions within the oral cavity;

allocating the consonant groups to corresponding columns in a first area of the area of 3 rows and 10 columns; and allocating a plurality of vowels to a second area of the area of 3 rows and 10 columns, wherein the first area is one of a left area and a right area of the area of 3 rows and 10 columns, and the second area is the other one thereof, wherein the allocating of a plurality of vowels includes:

allocating "I", "E", "A", "U", and "O" from among the plurality of vowels to the second row of the area of 3 rows and 10 columns; and allocating "I", "E", "A", "U", and "O" to the corresponding columns in the area of 3 rows and 10 columns according to the pronunciation positions in the oral cavity.

10. The method of claim 9, further comprising:

allocating "X", "Y", "W", and "Q" to at least some of the columns from among the columns to which "I", "E", "A", "U", and "O" are allocated in the area of 3 rows and 10 columns.

11. A method for allocating Korean characters and English characters to a keyboard including an area of 3 rows and 10 columns, the method comprising:

allocating a plurality of English consonants to a first area of the area of 3 rows and 10 columns;

allocating a plurality of English vowels to a second area of the area of 3 rows and 10 columns;

allocating a plurality of Korean consonants to the same column as that to which English consonants having similar phonetic values are allocated; and allocating a plurality of Korean vowels to an area other than the area to which the plurality of Korean consonants are allocated in the area of 3 rows and 10 columns.

12. The method of claim 11, wherein the allocating of a plurality of English consonants includes:

dividing the English consonants other than "X" and "Q" from among the plurality of English consonants into a plurality of consonant groups according to pronunciation position in the oral cavity;

allocating the respective consonant groups to the corresponding column in the area of 3 rows and 10 columns on the keyboard; and allocating a plurality of English consonants belonging to the respective consonant groups to the corresponding row according to usage frequency, wherein the first area is one of a left area and a right area of the area of 3 rows and 10 columns, and the second is the other one thereof.

13. The method of claim 12, wherein the allocating of a plurality of Korean consonants to the same column includes allocating the plurality of Korean consonants to positions to which the English consonants having similar phonetic values are allocated.

14. A method for allocating characters to a small keyboard including an area of 4 rows and 3 columns, the method comprising:

dividing at least some of a plurality of English consonants into a plurality of consonant groups according to pronunciation positions within the oral cavity;

allocating a plurality of English consonants belonging to the same consonant group to the same positions in the area of 4 rows and 3 columns; and allocating a plurality of Korean consonants to the same positions as those to which English consonants having similar phonetic values are allocated.

15. The method of claim 14, further comprising allocating a plurality of Korean vowels to a residual area other than the positions to which a plurality of Korean consonants are allocated in the area of 4 rows and 3 columns.

16. An input device including a keyboard having an area of 3 rows and 10 columns, the input device comprising:

a plurality of first keys to which a plurality of consonants are respectively allocated and that are formed in a first area of the area of 3 rows and 10 columns; and a plurality of second keys to which a plurality of vowels are allocated and that are formed in a second area of the area of 3 rows and 10 columns, wherein the first area is one of a left area and a right area of the area of 3 rows and 10 columns and the second area is the other one thereof, at least some of the plurality of consonants are divided into a plurality of consonant groups according to the pronunciation position within the oral cavity, and the consonants that are allocated to the first keys positioned in the same column in the area of 3 rows and 10 columns belong to the same consonant group, wherein the consonant having the greatest usage frequency in each consonant group is allocated to the first key that is positioned in the second row in the area of 3 rows and 10 columns, the consonant having the second greatest usage frequency is allocated to the first key that is positioned in the first row, and residual consonant is allocated to the first key that is positioned in the third row.

17. An input device including a keyboard having an area of 3 rows and 10 columns, the input device comprising:

a plurality of first keys to which a plurality of consonants are respectively allocated and that are formed in a first area of the area of 3 rows and 10 columns; and a plurality of second keys to which a plurality of vowels are allocated and that are formed in a second area of the area of 3 rows and 10 columns, wherein the first area is one of a left area and a right area of the area of 3 rows and 10 columns and the second area is the other one thereof, at least some of the plurality of consonants are divided into a plurality of consonant groups according to the pronunciation position within the oral cavity, and the consonants that are allocated to the first keys positioned in the same column in the area of 3 rows and 10 columns belong to the same consonant group, wherein the plurality of consonant groups include a first consonant group of "F" and "V", a second consonant group of "P", "M", and "B", a third consonant group of "T", "N", and "D", a fourth consonant group of "S", "L", and "Z", a fifth consonant group of "R", "C", and "J", and a sixth consonant group of "H", "G", and "K"; and "I", "E", "A", "U", and "O" are allocated to the second keys positioned in the second row from among the plurality of second keys.

* * * * *